United States Patent [19]

Zimmermann

[11] 3,850,386

[45] Nov. 26, 1974

[54] TAPE TRANSPORT ARRANGEMENT

[75] Inventor: Joseph J. Zimmermann, Elm Grove, Wis.

[73] Assignee: GTE Automatic Electric Laboratories Incorporated, Northlake, Ill.

[22] Filed: Dec. 15, 1972

[21] Appl. No.: 315,754

[52] U.S. Cl. .............................. 242/203, 242/75.51
[51] Int. Cl. ......................... B11b 15/32, G03b 1/04
[58] Field of Search .................... 242/200, 201–204, 242/206, 190, 75.11–75.51; 318/6, 7; 274/4 D, 11 D

[56] References Cited

UNITED STATES PATENTS

| | | | |
|---|---|---|---|
| 2,412,551 | 12/1946 | Pratt et al. | 242/75.11 |
| 3,045,937 | 7/1962 | Johnson | 242/203 X |
| 3,191,881 | 6/1965 | Campbell, Jr. et al. | 242/206 |
| 3,203,636 | 8/1965 | Owen | 242/203 |
| 3,294,333 | 12/1966 | Sanford | 242/203 |

*Primary Examiner*—Leonard D. Christian
*Attorney, Agent, or Firm*—David W. Heid

[57] ABSTRACT

A tape transport arrangement is disclosed wherein first and second drive motors are used to transport the tape in forward or reverse direction and a third drive motor is included for driving the tape at the playback speed. The tape driving arrangement, which includes the third drive motor, is selectively engageable with the tape to provide tape transport at a predetermined rate for the playback and is automatically disengageable to allow the transport motors to drive the tape at rates above the predetermined driving rate.

4 Claims, 3 Drawing Figures

TAPE TRANSPORT ARRANGEMENT

BACKGROUND OF THE INVENTION

This invention relates generally to tape transport arrangements and more particularly tape transport arrangements for magnetic recording tapes.

In present day transport arrangements it is quite common to control the forward and reverse driving of the tape through a complex mechanical arrangement. In addition when the tape is driven in the fast forward or fast reverse modes, the rate of travel in these modes is generally fixed and the operator has no control over the rates. Also it is quite common in tape transport arrangements of the present day vintage to include a mechanical brake arrangement to limit the reel off of tape from the supply reel so that the tape does not become tangled as it leaves the supply reel.

SUMMARY OF THE INVENTION

In the present invention a pair of drive motors are provided for driving the tape in either the forward or reverse direction, with means being provided to differentially apply operating potential to these motors. The driving motors are connected such that they tend to move the tape in opposite directions and by applying more potential to one than the other, the one receiving greater potential drives the tape while the other acts as an electrical brake to prevent the tape from tangling as it unreels from the supply reel. A third motor is included to drive the tape at a predetermined rate for playback of a message included thereon. A tape drive control circuit is included to engage the third driving means with the tape and drive it at said predetermined rate when the current to the first and second motors falls within a predetermined range, or in other words when the drive to the first and second motors is within certain limits.

A potentiometer is used to differentially apply operating potential to the first and second motors. When the potentiometer is placed in the fast forward or fast reverse position, the flow of current to the motors is sensed by the tape drive control circuit and drive to the tape from the third motor is released so that the tape may be moved in a forward or reverse direction at the desired speed determined by the potentiometer setting.

One of the objects of the present invention is to provide a tape transport arrangement which includes a minimum of mechanical elements and which utilizes principally electrical circuitry to control the tape driving functions.

Another object of the present invention is to provide a tape transport arrangement having first and second drive motors and means for controlling the potential applied thereto such that the tape may be driven in the forward or reverse direction by merely varying the potential applied to the first and second motors.

Another object of the present invention is to provide a tape transport arrangement wherein the reel from which the tape is being unwound is supplied with an electrical brake to prevent the tape from tangling thereabout.

Another object of the present invention is to provide a tape transport arrangement which includes a single control for adjusting the tape driving speed to a normal predetermined playback rate or variable forward or reverse rates of transport with a minimum of mechanical parts.

DESCRIPTION OF THE PREFERRED EMBODIMENT

Figure 1:
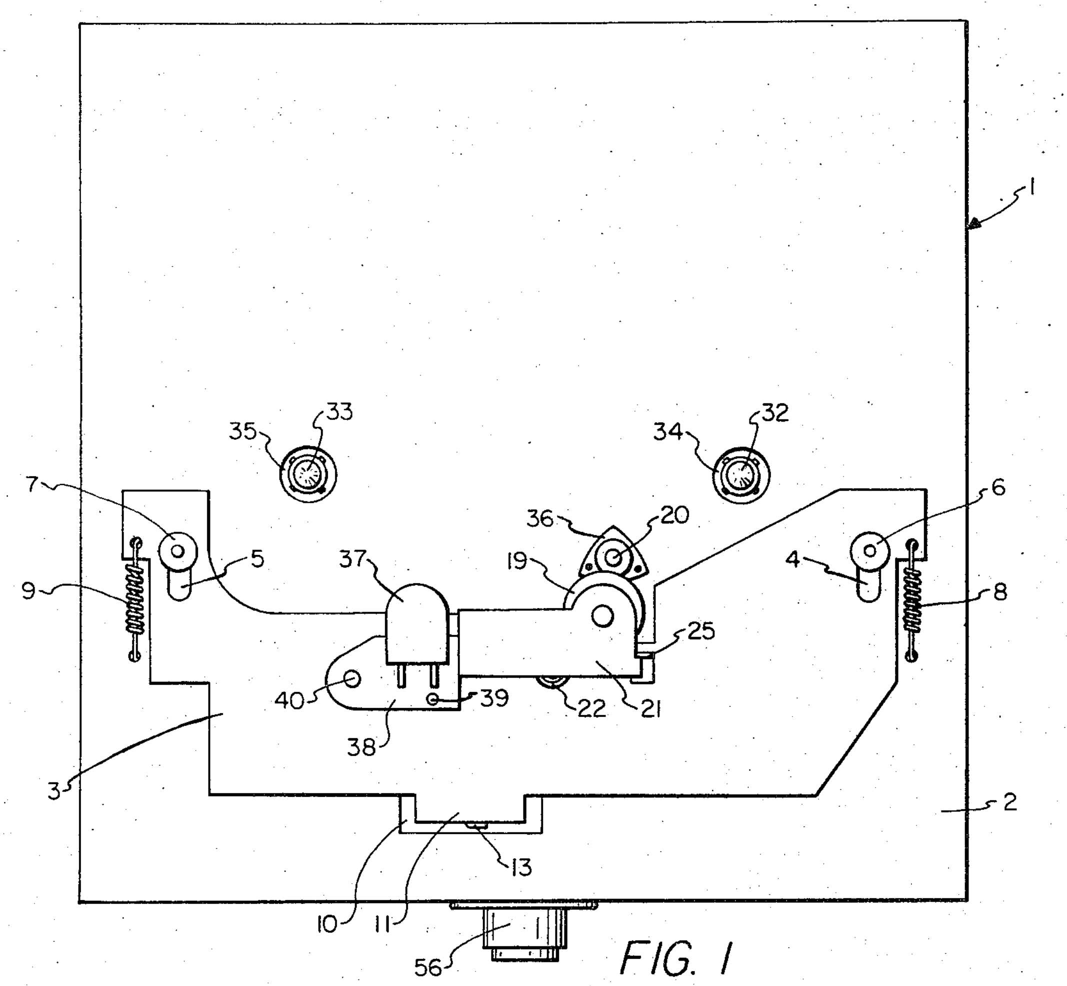
FIG. 1 is a top plan view of the tape transport arrangement of the present invention.

Referring to FIG. 1, the transport arrangement is enclosed in a housing 1 having a top platform designated 2 upon which a head and pressure roller slide plate 3 is suitably fixed for movement thereupon. Slide plate 3 is free to move forward and back to a limited extent which is defined by the apertures 4 and 5 in conjuction with upright posts 6 and 7 which extend from the top platform 2. A pair of springs 8 and 9, each having one end attached to an opening in slide plate 3 and its opposite end attached to a hold in the top plate 2, normally tension slide plate 3 into the position shown in FIG. 1. Top platform 2 includes an opening 10 which allows a tongue portion 11 of slide plate 3 to extend below top platform 2, said opening 10 being of such size that the slide plate 3 may move freely back and forth without tongue 11 interfering with top platform 2.

Figure 2:
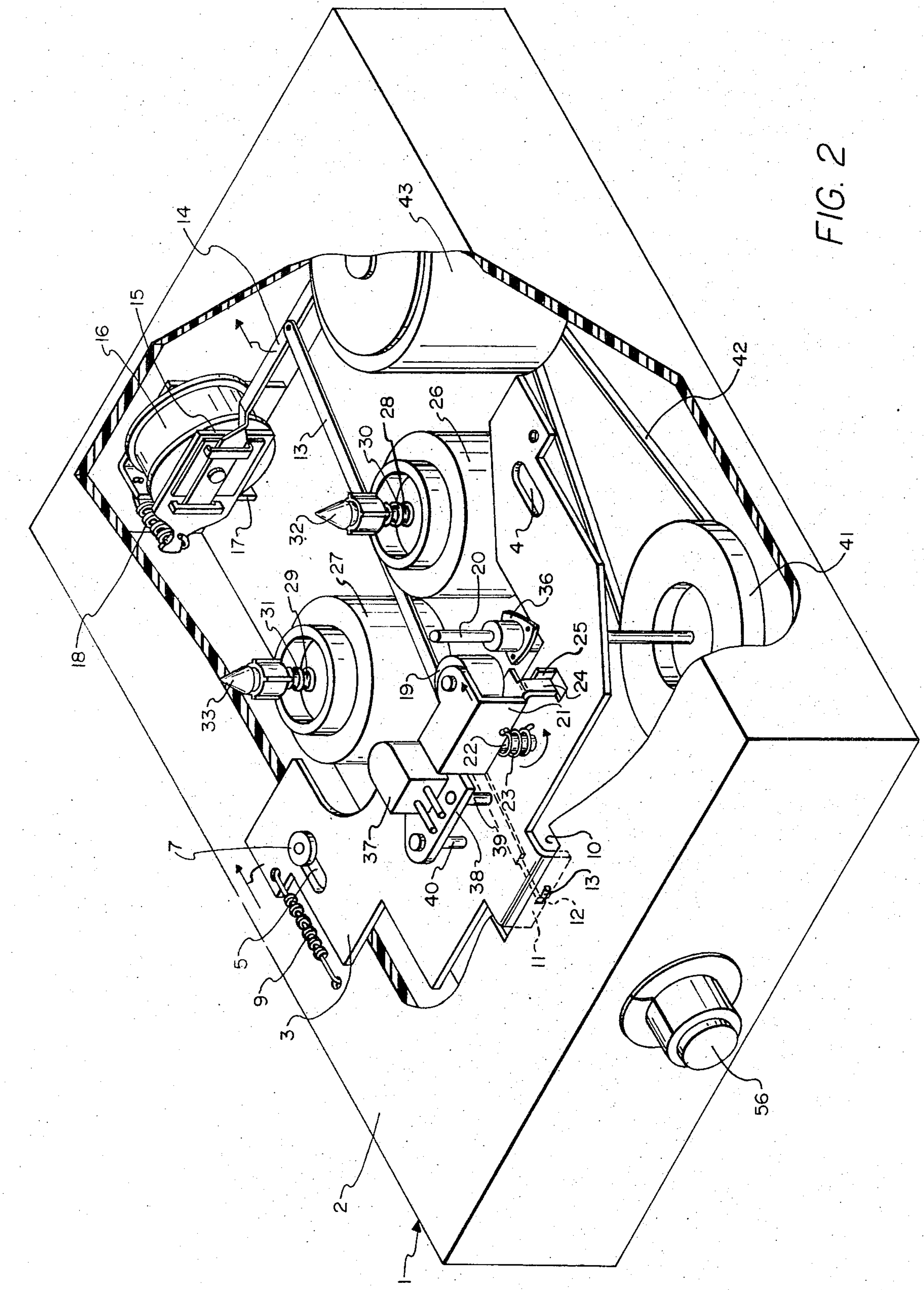
FIG. 2 is a perspective view of the tape transport arrangement of the present invention, with a portion of the case of the transport arrangement being broken away to show the various parts internal to the case.

The relationship between tongue portion 11 and opening 10 can better be appreciated by reference to FIG. 2. In FIG. 2, it will also be noted that tongue portion 11 includes opening 12 into which one end of connecting arm 13 is securely fastened. The opposite end of connection arm 13 is attached to extension 14 of armature 15 which is operated by solenoid assembly 16. It should be noted that armature 15 is pivoted about plate portion 17 of the solenoid assembly 16 and by virtue of biasing spring 18, armature 15 is held in the position as shown when the solenoid is not energized. It will also be noted in FIG. 1 that slide plate 3 is in the same relative position as that shown in FIG. 2. During the operation of the transport arrangement, which will be discussed subsequently, when solenoid assembly 16 is energized, slide plate 3 will be moved forward by virtue of connecting arm 13 and this action will cause the pressure roller 19 to press the recording tape against capstan 20 whereby the recording tape may be driven at a predetermined rate for playback of the tape.

Pressure roller 19 is free to rotate in its holder 21 which is pivoted about shaft 22. Shaft 22 has its lower end securely fastened to slide plate 3. A spring 23, having one end connected to slide plate 3, is coiled about shaft 22 and has its opposite end connected to holder 21. Spring 23 is wound in such a direction that holder 21 and pressure roller 19 are pivoted toward capstan 20, however the rotation in that direction is limited to a maximum by virtue of arm 24 of holder 21 being restrained by an upturned extension 25 of slide plate 3.

Now referring to both FIGS. 1 and 2, the tape transport motors 26 and 27 include drive shafts 18 and 29 respectively and coil springs 30 and 31 which force the reel driving caps 32 and 33 in an upward direction. Reel driving caps 32 and 33 are restricted in their upward travel by retainers (not shown) on shafts 28 and 29.

Referring to FIG. 1, it will be noted that reel driving caps 32 and 33 extend above the top platform 2 through openings 34 and 35. Bearing assembly 36 for capstan 20 is mounted on the top platform 2 and supports the upper end of capstan 20. With the tape transport as shown in FIGS. 1 and 2, it will be appreciated that a tape may be inserted or removed from the assembly since the pressure roller 19 is spaced apart from capstan 20 and hence the tape may be freely inserted or removed therefrom. No tape guide arrangements have been shown with respect to the tape transport since one use of the transport arrangement could be with a cassette type tape cartridge which, as is well known to those in the art, includes its own tape guide arrangements. This tape transport arrangement could be used equally well with any reel to reel arrangement, and it will of course be appreciated that if individual reels are used, well known tape guide means would be incorporated onto top platform 2 of the transport arrangement.

As can be seen in FIGS. 1 and 2, a magnetic tape recording and reproducing head 37 is supported on slide plate 3 via its support member 38 and support posts 39 and 40, each having one end attached to support member 38 and their opposite ends attached to slide plate 3. With this support arrangement, head 37 is placed adjacent the travel path of the record and reproduce tape and when slide plate 3 is pulled forward through the action of solenoid assembly 16, the pressure roller 19 in conjunction with capstan 20 will pull the magnetic recording tape past head 37.

Returning to FIG. 2, it will be noted that capstan 20 receives its driving force via flywheel 41 which is attached to the lower end of capstan 20. Flywheel 41 has a pulley (not shown) attached thereto, around which drive belt 42 is looped. Drive motor 43 provides the driving means for drive belt 42 via a conventional pulley and drive shaft arrangement (not shown).

Figure 3:
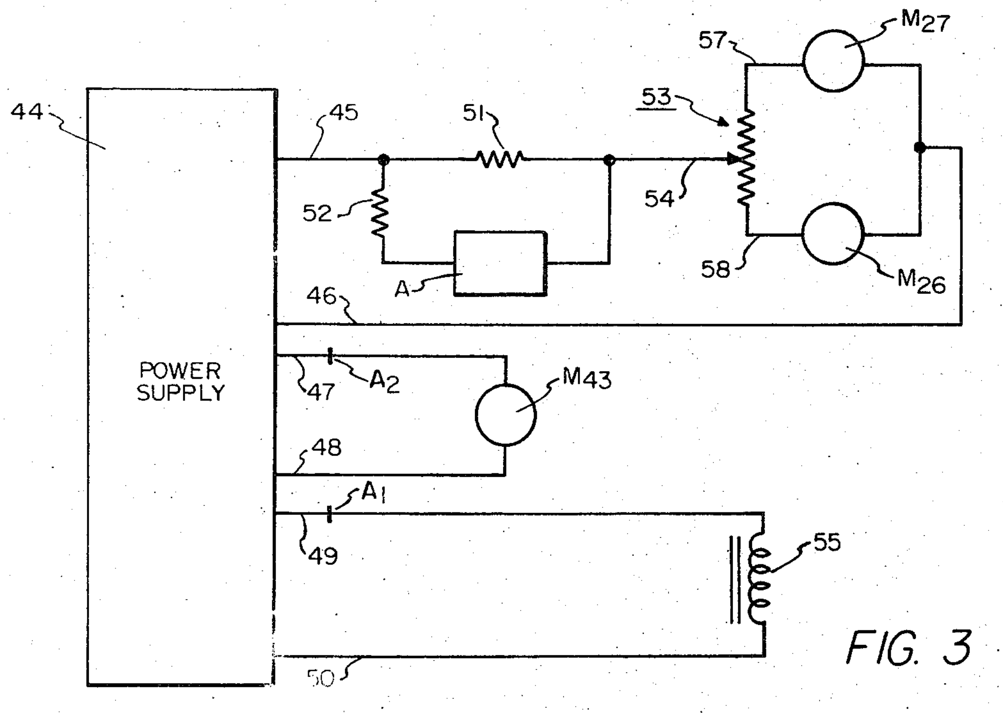
FIG. 3 is a schematic diagram of the circuitry of the tape transport arrangement of the present invention.

In order to understand the operation of the present tape transport arrangement it will be necessary to consider the schematic diagram of FIG. 3. In FIG. 3 tape transport motors 26, 27 and 43 are schematically designated $M_{26}$, $M_{27}$ and $M_{43}$, respectively. The tape transport arrangement is provided with a power supply 44 having power outputs to conductors 45 and 46 for operating transport motors 26 and 27, outputs to conductors 47 and 48 for operating drive motor 43 and finally an output via conductors 49 and 50 of suitable potential for operating solenoid coil 55 of solenoid assembly 16. First considering the circuit including tape transport motor 26 and 27, starting at conductor 45 the circuit to the motors includes voltage dropping resistor 51 and in parallel therewith the series connection of current limiting resistor 52 and relay A. Potentiometer 53, having slider arm 54 which is connected to the junction point of resistor 51 and the one lead of relay A, is used to apportion the potential supplied to motors $M_{26}$ and $M_{27}$. Conductor 57 of motor $M_{27}$ is connected to one end of potentiometer 53 and in a similar manner conductor 58 is connected to the other lead of potentionmeter 53. The second electrical conductors of motors $M_{26}$ and $M_{27}$ are connected in common and returned to the power supply 44 via conductor 46. Motors $M_{26}$ and $M_{27}$ are electrically connected in the circuit such that they tend to rotate in opposite directions, hence by adjusting slider arm 54 toward one or the other, the one receiving the greater potential will prevail and the tape will be rotated in the direction of rotation of the prevailing motor.

Now considering the operation of the tape transport arrangement, first a tape would be loaded onto the transport arrangement with one reel inserted over reel driving cap 33, the tape positioned between capstan 20 and pressure roller 19 and the other tape reel positioned over reel driving cap 32. As mentioned previously, appropriate guide means would be utilized and in the case of a cassette type tape cartridge would be included in the cassette itself. The operator would then energize the power supply and conductors 45 through 50 would receive operating potential. Now if the operator adjusts control knob 56, which is affixed to slider arm 54, such that the path from slider arm 54 to conductor 58 includes less impedance than the path from slider arm 54 to conductor 57, then motor $M_{26}$ would be receiving the greater potential and hence would prevail and move the tape to the right past magnetic recording and reproducing head 37. With slider arm 54 just slightly off center, the current being supplied to motors $M_{26}$ and $M_{27}$ will be such that a voltage drop across resistor 51 is not sufficient to operate relay A. With relay A unoperated, then motor $M_{43}$ will be receiving operating potential through conductor 47, break contact $A_2$ and conductor 48. Since motor $M_{43}$ is energized, capstan 20 will of course rotate. Also, with relay A in the unoperated condition, solenoid coil 55 will be energized through conductor 49, break contacts $A_1$ and conductor 50. With solenoid coil 55 energized, then armature 15 will be drawn toward the coil 55 and connecting arm 13 will pull head and pressure roller slide plate 3 forward and the tape will be pressed between pressure roller 19 and capstan 20. Under these conditions the drive motor $M_{43}$ will be moving the tape at its predetermined speed such that the information recorded on the tape may be picked up by magnetic recording and reproducing head 37. Under these circumstances motor $M_{27}$ will be tending to rotate the tape in the opposite direction from motor $M_{26}$, however the combined drive from motor $M_{26}$ and the capstan 20 will move the tape to the right and motor $M_{27}$ will act as an electrical brake to keep the tape from unreeling and tangling about the reel. Tape movement in this direction will hereinafter be referred to as the forward direction and results in the take up of tape onto the tape reel positioned on reel driving cap 32 and unreeling of tape from the reel connected to reel driving cap 33.

Now should the operator desire to advance the tape at a higher rate in the forward direction than that being moved by motor 43, then he merely needs to rotate control knob 56 in the direction that moves slider arm 54 nearer to conductor 58. the current supplied to motor $M_{26}$ will be vastly increased, with a resulting increase in the voltage drop across resistor 51, and a point will be reached at which this voltage drop is sufficient to operate relay A. Upon the operation of relay A the break contact $A_1$ will open and hence solenoid coil 55 will be deenergized. Upon this happening, the solenoid 16 will of course be released and head and pressure roller slide plate 3 will be returned to its original position by virtue of springs 8 and 9. Under these conditions the tape is free to move in a forward direction unimpeded by the drive of motor $M_{43}$ since the pressure roller 19 will be moved back away from the tape and the tape may pass freely without interference between the pressure roller 19 and capstan 20. It will be noted by reference to the schematic diagram in FIG. 3, that the energizing circuit for motor $M_{43}$ also includes break contact $A_2$ which of course will open the driving circuit to motor $M_{43}$ when relay A is operated. It will of course be appreciated that it would not be necessary to de-energize motor $M_{43}$ during the time which the head and pressure roller slide plate is moved away from capstan 20 since at this time the pressure roller will not engage the capstan and attempt to drive the tape.

After having moved the tape in a fast forward direction a desired amount of time, the operator may then of course return control knob 56 to its original position so that slider arm 54 is somewhat to the right of center of travel and the tape will again be driven under the control of motor 26.

With the slider arm 54 now slightly to the right of center, the current through voltage dropping resistor 51 will fall to a value such that the voltage drop thereacross will not be sufficient to keep relay A operated and upon the release of relay A solenoid coil 55 will again be energized through break contacts $A_1$ and the motor $M_{43}$ will agains rotate. Upon the operation of solenoid 16, head and pressure roller slide plate 3 will be pulled forward and the tape will be driven under the control of capstan 20. At a desired time the operator may then decide to move the tape in the opposite, or rewind, direction and this may be accomplished by simply rotating control knob 56 in the opposite direction so that slider arm 54 is substantially to the left of center. Under these circumstances motor $M_{27}$ will be receiving the substantially increased portion of the available supply voltage and the current through voltage dropping resistor 51 will be increased such that relay A will again be operated. As was true in the fast forward direction, in the fast rewind position solenoid coil 55 will be de-energized and the head and pressure roller slide plate 3 allowed to return to its original position under the control of springs 8 and 9 and the tape may then be rewound in a fast rewind speed under the control of motor $M_{27}$.

Thus from the foregoing it will be appreciated that substantially the total operation of the tape transport arrangement can be placed under a single control wherein the operator may drive the tape at a playback speed under the control of motor $M_{43}$ or a fast forward or fast rewind at variable rates, under the control of motors $M_{26}$ or $M_{27}$, respectively. It will also be appreciated that for driving current to motors 26 and 27 within a first range of values, occurring when slider arm 54 is positioned within a range of travel around the center of potentiometer 53, relay A will be de-energized and the rate of travel of the tape will be controlled by motor 43. However, there is a second, higher range of current values, occurring in the fast forward and fast rewind modes of travel, wherein the rate of tape travel is under the control of motors 26 and 27.

What is claimed is:

1. In a tape transport arrangement for transferring a length of tape from one location to another, first drive means for moving said tape in a first direction; second drive means for moving said tape in a second direction opposite to said first direction; transport control means, connectible to a source of electrical potential, for differentially applying an operating potential to said first and second drive means whereby said tape may be selectively moved in said first or second directions; third driving means for moving said tape at a predetermined rate; and tape drive control means responsive to the current supplied to said first and second drive means falling within a predetermined range of currents to cause said third driving means to move said tape at said predetermined rate.

2. The tape transport arrangement as claimed in claim 1 including tape engaging means selectively movable into contact with said tape under the control of said tape drive control means for pressing said tape against said third driving means when said motor currents fall within said predetermined range to thereby drive said tape at said predetermined rate.

3. The tape transport arrangement as claimed in claim 2 including means for biasing said tape engaging means out of contact with said tape, and solenoid means, controlled by said tape drive control means, operatively coupled to said tape engaging means for moving said tape engaging means in opposition to said biasing means and into contact with said tape when said motor currents are within said predetermined range.

4. In a tape transport arrangement for transferring a length of tape from one location to another, first drive means for moving said type in a first direction;

second drive means for moving said tape in a second direction opposite to said first direction;

transport control means, connectable to a source of electrical potential, for differentially applying an operating potential to said first and second drive means whereby said tape may be selectively moved in said first or second directions;

third driving means for moving said tape at a predetermined rate; and tape drive control means, including a relay, responsive to the current supplied to said first and second drive means falling within a predetermined range of currents to cause said third driving means to move said tape at a predetermined rate, said relay operating in response to said motor current attaining a magnitude outside of said range to disable said third driving means and allow the travel of said tape to be determined by said first or second drive means.

* * * * *